Patented Sept. 19, 1944

2,358,519

UNITED STATES PATENT OFFICE 2,358,519

MONOAZO DYESTUFFS AND THEIR MANUFACTURE

Adolf Krebser, Riehen, near Basel, and Werner Bossard and Werner Kuster, Basel, Switzerland, assignors to the firm J. R. Geigy A. G., Basel, Switzerland No Drawing. Application March 25, 1941, Serial No. 385,192. In Switzerland April 26, 1940

6 Claims. (Cl. 260—198)

There is known a large number of monoazo dyestuffs of the general formula

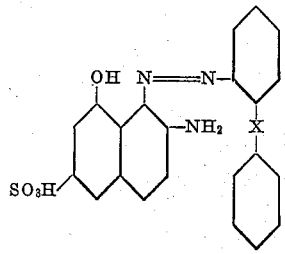

wherein X means a SO—, SO$_2$NH— or $$SO_2-N- \atop | \atop alkyl$$

group, with unsubstituted or substituted benzene nuclei.

It has now been found that by introducing a sulfonic acid group in 3'-position of the diazonium compound there are obtained monoazo dyestuffs of the general formula

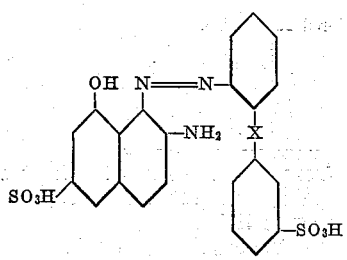

in which formula X has the above cited meaning and both the benzene nuclei can also be further substituted, these new monoazo dyestuffs being technically very valuable. The latter are prepared by coupling diazotized 2-aminodiphenyl sulfone-3'-sulfonic acid and their substitution products or diazotized 2-aminobenzene-1-sulfonic acid-N-phenylamide-3'-sulfonic acid or 2-aminobenzene-1-sulfonic acid-N-alkyl-N-phenylamide-3'-sulfonic acid with 2-amino-8-hydroxynaphthalene-6-sulfonic acid in an acid medium.

By introducing a second sulfonic acid group into the dyestuff molecule in 3'-position of the diazo component, there are surprisingly obtained new dyestuffs of remarkable solubility which advantageously distinguish themselves from the known analogous monosulfonated dyestuffs. The acid wool dyeings do not only show a nearly unaltered equalizing power, but they are generally somewhat bluer and purer and distinctly faster to light. Such an influence of an external sulfonic acid group is new and surprising and could not be foreseen.

The present invention is illustrated by the following examples, the parts being by weight, except where otherwise is stated.

Example 1

38.4 parts of 2 - amino - 4 - acetylamino - 4' - methyl-diphenyl sulfone-3'-sulfonic acid are diazotized according to known methods in an aqueous solution. The diazonium compound is combined with an acid suspension of 24 parts of 2-amino - 8 - hydroxynaphthalene-6-sulfonic acid. The coupling beginning at once is accelerated by slowly neutralizing the exceeding mineral acid. The dyestuff formation being completed, the red dyestuff is salted out, filtered and dried. Thus a violet powder is obtained which from an acid bath dyes wool of uniform red shades of a very good fastness to light.

The 2-amino-4-propionylamino- or -phenoxyacetyl - amino - 4' - methyl - diphenylsulfone-3'-sulfonic acids yield similar dyestuffs.

Example 2

31.3 parts of 2-aminodiphenyl sulfone-3'-sulfonic acid are indirectly diazotized, as shown, and the diazonium compound is combined with an acid suspension of 24 parts of 2-amino-8-hydroxynaphthalene-6-sulfonic acid. The coupling is soon completed by neutralizing excess mineral acid in the usual manner. The dyestuff is salted out, filtered and dried. The dyestuff thus obtained, which is a bright red powder, dyes wool from an acid bath pure, bluish-red shades of excellent fastness to light.

Example 3

41.3 parts of 2-amino-5-acetylaminobenzene-1-sulfonic acid-N-ethyl-N-phenylamide-3'-sulfonic acid are indirectly diazotized according to known methods. The diazonium compound is added to a suspension acid to Congo-red of 24 parts of 2-amino-8-hydroxynaphthalene-6-sulfonic acid and then the mineral acid is slowly neutralized in the usual manner until a weakly Congo-red acid reaction is obtained. The coupling is completed after a short time. Thus one obtains a blue-red dyestuff which, after being filtered and dried, forms a dark red powder and yields when applied on wool from an acid bath uniform bluish-red dyeings which are distinguished by a very good fastness to light.

Dyestuffs containing instead of the acetyl group a propionyl radical and instead of the N-ethyl group a homologous group such as the propyl or butyl group possess very similar properties. The N-phenylamine radical may also be replaced by the 4-chlorophenylamine radical or a tolyl amine radical.

Further examples are indicated in the following table:

| | Diazo component | Coupling component | Color of the dyestuff powder | Color of the acid wool dyeing |
|---|---|---|---|---|
| 4. | NH$_2$ / SO$_2$ / NH.CO.CH$_3$ / SO$_3$H (phenyl-SO$_2$-phenyl) | 2-amino-8-hydroxy-naphthalene-6-sulfonic acid. | Violet | Bluish-red. |
| 5. | NH$_2$ / SO$_2$N(C$_2$H$_5$) / SO$_3$H | ----do---- | Violet-red | Red. |
| 6. | NH$_2$ / SO$_2$ / CH$_3$ / SO$_3$H | ----do---- | Bluish-red | Bluish-red. |
| 7. | NH$_2$ / SO$_2$NH / SO$_3$H | ----do---- | Dark violet | Red. |
| 8. | NH$_2$ / SO$_2$ / CH$_3$ / NH.CO.CH$_3$ / SO$_3$H | ----do---- | Violet | Bluish-red. |
| 9. | NH$_2$ / SO$_2$ / CH$_3$ / NHCOC$_6$H$_5$ / SO$_3$H | ----do---- | Dark bluish-red. | Do. |
| 10. | NH$_2$ / SO$_2$ / Cl / SO$_3$H | ----do---- | Bluish-red | Do. |

Instead of the N-ethyl compound in No. 5 of the above table there may also be used the N-methyl compound.

In Nos. 6, 8 and 9 the methyl group can be substituted by an alkoxy group such as the methoxy, ethoxy group and so on without a strong alteration of the properties of the dyestuffs thus obtained.

In No. 7 the phenyl amine radical may also be substituted by a p-bromophenyl- or a tolyl- or a suitable xylylamine radical.

What we claim is:

1. The monoazo dyestuffs having in the free state the following general formula

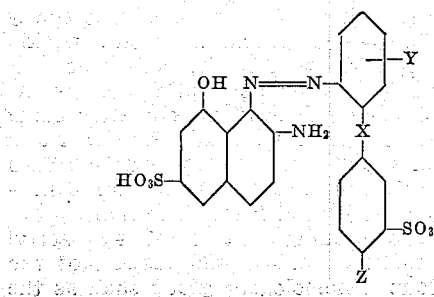

wherein Y is in one of the positions meta and para to X and means a member of the group consisting of H and acylamino and Z means a member of the group consisting of H, CH$_3$, halogen, OCH$_3$ and OC$_2$H$_5$, X means a member of the group consisting of SO$_2$, SO$_2$NH and SO$_2$.N.alkyl, said dyestuffs being red to violet powders, dyeing wool from acid bath red to violet shades of excellent fastness properties, especially very good fastness to light.

2. The monoazo dyestuffs having in the free state the following general formula

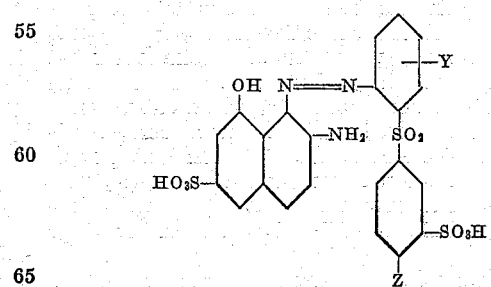

wherein Y is in one of the positions meta and para to the SO$_2$ group and means a member of the group consisting of H and acylamino and Z means a member of the group consisting of H, CH$_3$, halogen, OCH$_3$ and OC$_2$H$_5$, said dyestuffs being red to violet powders, dyeing wool from acid bath red to violet shades of excellent fastness properties, especially very good fastness to light.

3. The monoazo dyestuffs having in the free state the following general formula

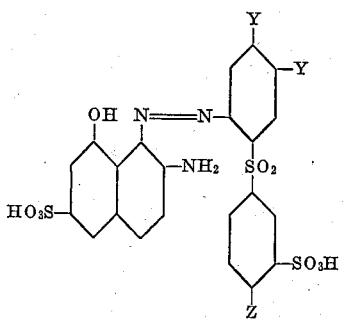

wherein Y means a member of the group consisting of H and acylamino, subjected to the condition that not more than one Y can be different from H, and Z means a member of the group consisting of H, CH₃, halogen, OCH₃ and OC₂H₅, said dyestuffs being red to violet powders, dyeing wool from acid bath red to violet shades of excellent fastness properties, especially very good fastness to light.

4. The monoazo dyestuff having in the free state the following formula

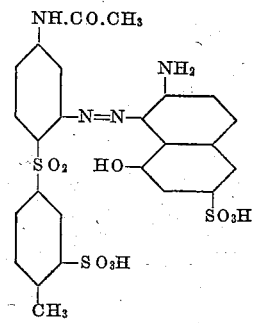

being a violet powder, dyeing wool from acid bath even red shades of excellent fastness to light.

5. The monoazo dyestuff having in the free state the following formula

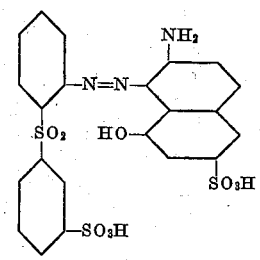

being a bright red powder, dyeing wool from acid bath pure bluish-red shades of excellent fastness to light.

6. The monoazo dyestuff having in the free state the following formula

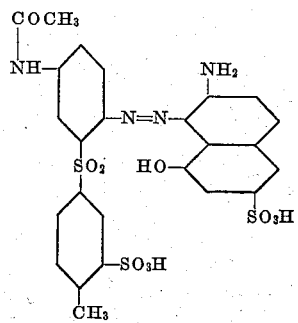

being a violet powder, dyeing wool from acid bath bluish-red shades of excellent fastness properties.

ADOLF KREBSER.
WERNER BOSSARD.
WERNER KUSTER.